April 8, 1924.
J. W. BOND
FLOATING SINKER
Filed Aug. 3, 1922
1,489,421
3 Sheets-Sheet 2
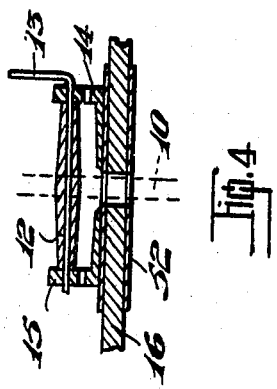
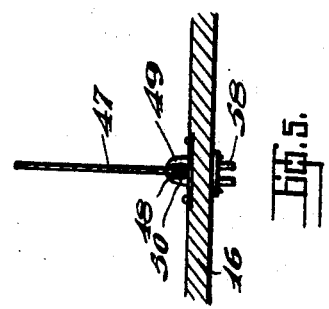
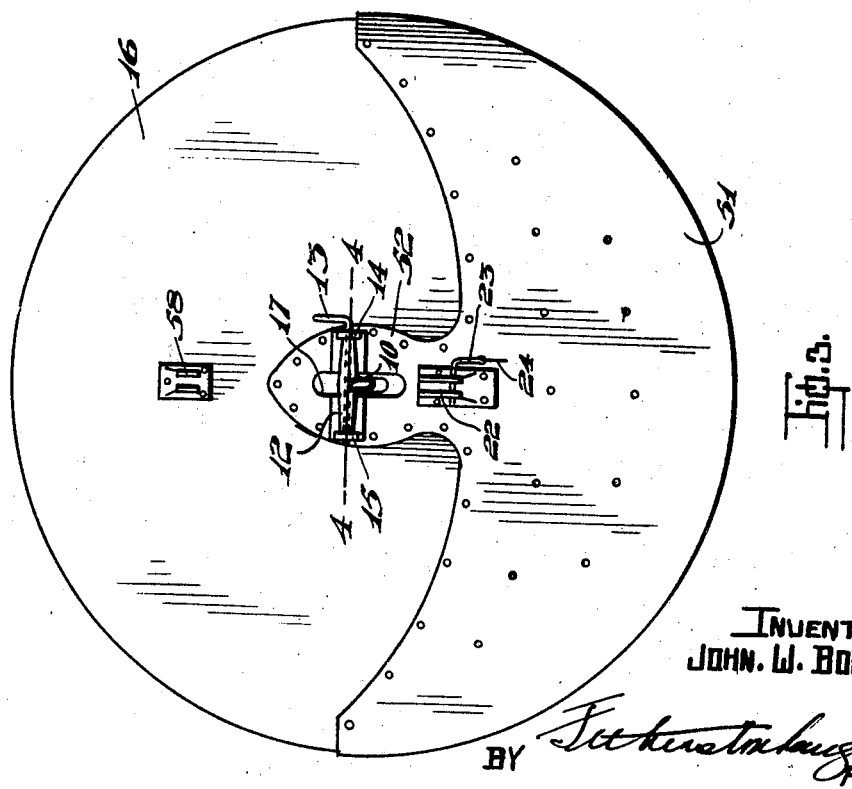
INVENTOR
JOHN. W. BOND.
BY
ATTYS.

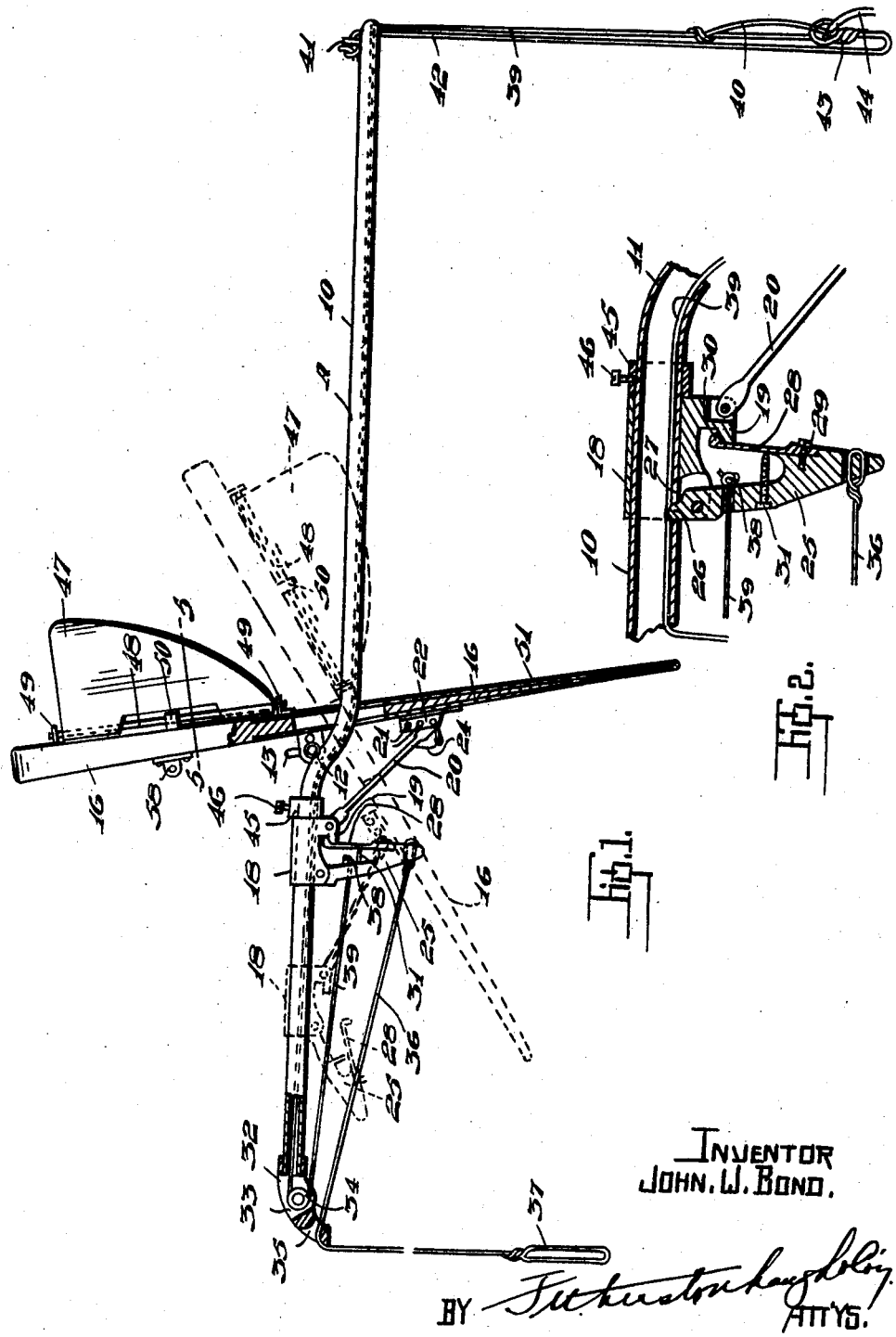

April 8, 1924.
J. W. BOND
FLOATING SINKER
Filed Aug. 3, 1922
1,489,421
3 Sheets-Sheet 3
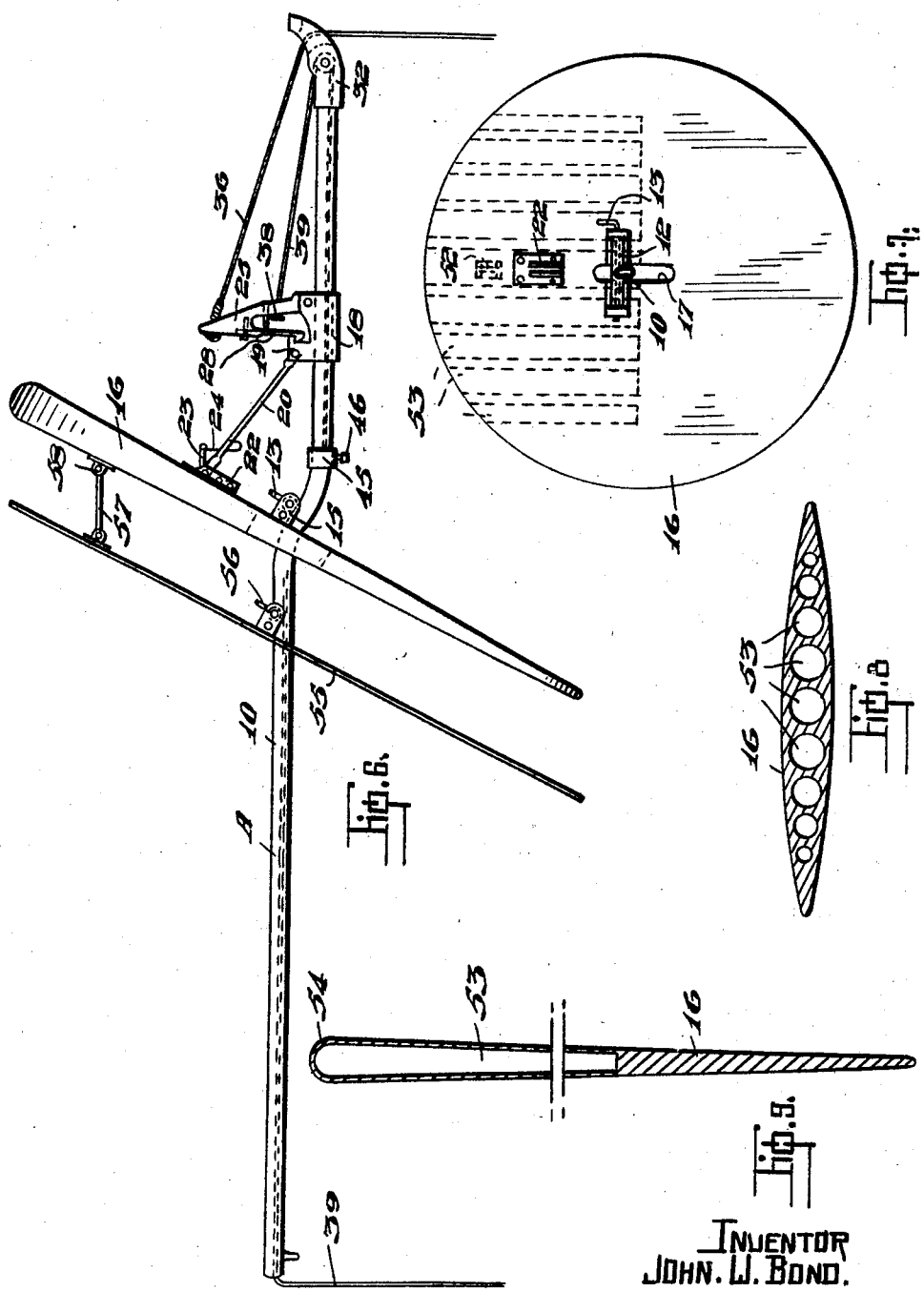
INVENTOR
JOHN. W. BOND.

Patented Apr. 8, 1924.

1,489,421

UNITED STATES PATENT OFFICE.

JOHN WILLIAM BOND, OF VICTORIA, BRITISH COLUMBIA, CANADA.

FLOATING SINKER.

Application filed August 3, 1922. Serial No. 579,492.

*To all whom it may concern:*

Be it known that I, JOHN WILLIAM BOND, a subject of the King of Great Britain, and resident of the city of Victoria, in the Province of British Columbia, Dominion of Canada, have invented certain new and useful Improvements in Floating Sinkers, of which the following is a specification.

This invention relates to floating sinkers, and has for its objects to provide an improved sinker designed to be used in trolling and adapted to normally travel between two waters, to provide a means whereby on a fish catching the bait at the end of the troll, the sinker would be caused to float.

This invention consists of an improvement on the subject matter of my United States Patent No. 1,408,927, issued March 7th, 1922.

Further objects of my invention are to provide an improved device, that is simple in construction, not liable to go out of repair, and generally to adapt the several parts to better perform the functions required of them.

With the above and other objects in view, the invention consists essentially of the improved construction hereinafter described in detail in the accompanying specification and drawings.

In the drawings:

Figure 1 is a side view partly in elevation and partly in section of the improved floating sinker.

Figure 2 is an enlarged sectional detail taken through the shank and trigger.

Figure 3 is a section of the shank showing the disc in rear elevation.

Figure 4 is an enlarged cross section on the line 4—4 of Figure 3.

Figure 5 is a cross section on the line 5—5 of Figure 1.

Figure 6 is a side elevation of a slight alternative of the sinker.

Figure 7 is a section of the shank in the alternative form, showing the disc in rear elevation.

Figure 8 is a cross section taken through the disc shown in Figure 7.

Figure 9 is a longitudinal section of the same disc.

Like characters of reference indicate corresponding parts in all the figures.

Referring to the drawings, A represents the improved floating sinker comprising a tubular shank 10, which is offset at approximately two-thirds of its length as shown at 11. Formed integral with the shank 10 at the offset portion 11 or otherwise fastened thereto is a bearing 12 through which extends an offset pin 13 engaging a pair of apertured lugs 14 and 15 carried by a disc 16 at the centre thereof, and on either sides of a slot 17 through which the shank 10 extends.

It will be obvious that by means of this arrangement, the disc 16 is pivotally mounted relatively to the shank 10.

In order to adjust the transverse angular position of the disc 16 relatively to the axis of the shank 10, the lugs 14 and 15 are each provided with two apertures so that the pin 13 may if it is desired to vary the angular position of the disc relatively to the shank, be engaged with the top aperture of the lug 14, and the lower aperture of the lug 15, or vice versa.

Slidably mounted along the shank 10 is a sleeve 18 formed with a lug 19 to which is pivotally connected a connecting link 20 having its free end formed with a hole designed to register with one of a series of holes 21 formed on a projection 22 carried by the disc 16 and designed to be retained therein by means of a pin which is offset as at 23.

The offset portion 23 of the pin is designed to be connected to the connecting link 20 by a flexible member 24 in order to normally retain the offset pin 23 in angular position relatively to the disc 16.

Pivotally mounted at the end of the sleeve 18 remote to that connected with the connecting link 20 is a trigger 25, which is formed adjacent its pivot point with a lug 26 designed to engage one of a series of slots 27 formed along the shank 10.

A resilient element 28 is secured to the trigger as at 29 and formed with a head or shoulder 30 designed to normally engage the lug 19 of the sleeve 18. A tensioning screw 31 is provided in the trigger 25 in order to adjust the tension of the resilient element 28.

The back end of the shank 10 is provided with a curved projection 32 which is slotted as at 33 and a pulley 34 is mounted in the slot 33. A hole 35 is formed on the outer end of the curved projection 32 and through this hole 35 extends a flexible member 36, which is connected to the outer end of the trigger 25. The free end of the flexible member 36 is formed with a loop 37 to which is to be connected the line carrying the troll and the bait.

Connected to the trigger 25 as shown at 38 is a second flexible member 39, which engages the pulley 34 and extends through the hollow shank 10 and has its free end looped as at 40.

The free end of the shank 10 is provided with an eye 41 to which is secured the end of a retaining element 42, which is secured to the loop 40 as shown at 43. A line 44 is fastened to the end of the retaining element 42 and extends to the boat. The retaining member 42 has to be made of a greater length than the upwardly extending portion of the flexible element 39 in order that no strain whatever would be taken by the retaining element 42.

This element 42 is provided only as a safety device in case the flexible element 39 will break, in order not to lose the sinker.

A collar 45 is provided on the shank 10 and securely retained thereto by means of set screws 46 and the collar 45 is designed to limit the longitudinal sliding movement of the sleeve 18 along the shank 10, as shown in dotted lines in Figure 1.

The upper part of the disc 16 is provided with a rudder 47, which is formed rigid on a rod 48 journalled in bearings 49 formed on the disc 16. The spindle 48 carries a lug 50 which has its lateral sides curved, but its bottom face straight in order to lock the rudder plate 47 in right angular position relatively to the disc 16.

As there is a certain resiliency between the rudder plate 47 and the spindle 48, it will be obvious that the rudder may be unlocked from its working position by merely forcing the plate 47 aside in order to cause its spindle 48 to pivot in its journals 49.

The discs 16 may as shown in Figure 1 of the drawings be of wedge shape and formed of wood reinforced with a metallic covering 51 formed with a tongue 52 reinforcing the sides of the slots 17 provided in the centre of the disc 16, and the outer ends of the cover 51 may be curved upwardly in order to reinforce the edges of the disc 16. Also for the purpose of buoyancy when it is not desired to use wood as the material to build the disc 16, the latter may be formed of metal as shown in Figures 7, 8 and 9 of the drawing, when the upper half of the disc is formed with a series of cavities 53 which are to be hermetically closed as at 54.

It will however be found that for ordinary fishing the reinforced wooden disc shown in Figures 1 and 3 of the drawings will satisfy every condition required, while for deep water fishing, the metallic disc shown in Figures 7 and 9 will have more advantages over the wooden disc.

Also to cause the sinker to sink deeper into the water without having to enlarge the disc 16, the latter is disengaged through the pin 13 being pulled off from the bearing 12, and the shank 10 is then turned a half circle, and the pin 13 re-inserted into the bearing 12 and the apertured lugs 14 and 15 in order to again pivotally secure the disc 16 to the shank 10, but in a position reverse to that shown in Figure 1 of the drawings.

A second disc 55 is then pivotally mounted along the shank 10 as at 56, and this disc 55 is retained in parallel position relatively to the disc 16 by means of the connecting link 57, which is pivotally carried by the disc 55 and anchored to a pair of apertured lugs 58 carried by the disc 16 as shown in Figure 3 of the drawings.

As is clearly shown in the drawings, the disc 55 is not wedge-shaped as the disc 16, but is straight throughout.

When this improved sinker is in use, the line 44 from the fishing boat is fastened to the end of the retaining element 42 and the looped flexible element 39 which is secured to the line 44 and extends through the hollow shank 10 is secured to the trigger as shown at 38, while the second flexible element 36 is secured to the outer end of the trigger 25 and extends through the hole 35 in the curved extension 32 provided on the end of the shank 10.

The line carrying the troll and bait is secured to the loop 37 of the flexible element 36, and the plate 16 is set at the desired angle by the sleeve 18 being moved along the shank 10 in order to bring it in registering position with the desired slot 27 provided in the shank, when the trigger 25 is raised in order to cause the lug 26 to engage the slot 27.

The transverse angular position of the disc 16 relatively to the axis of the shank 10 may be adjusted as previously described by the insertion of the pin 13 in one of the apertures provided in the lugs 14 and 15 carried by the disc 16.

It is desired to point out that if when trolling the sinker strikes an obstruction as a stone in the water bed, the force will operate the trigger 25 and release the disc 16 which will thus slide against the obstruction and pull the hook upwardly in its tendency to float, thus avoiding the latter to catch on the obstruction and break the line.

As many changes could be made in the above construction, and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

If desired the floater 16, instead of assuming the form of a circular disc as shown in Figure 3, may be square or in fact of any shape desired. The square form would only differ from the circular one in shape since its construction would otherwise be exactly the same as that described with respect to disc 16. The square floater could also be made in the form illustrated in Figures 7 to 9 of the drawings.

When this improved sinker is to be used, the loop 44 is secured to a hook on the boat and the sinker allowed to trail behind with the disc 16 in the position shown in Figure 1 of the drawings, which will obviously cause the device to sink between two waters. On a fish being hooked by the bait secured to the loop 37, a pull will be transmitted through the flexible element 36 to the trigger 25, which will in turn be operated to disengage with the slot 27 and the lug 19. At the same time a pull is simultaneously exerted by the travel of the boat and through the flexible member 39 on the trigger 25. The combined pull of the two flexible members 36 and 39 operating not only to disengage as above stated, the trigger from the collar, but also at the same time to move the latter backwards to the position shown in dotted lines in Figure 1, this will cause the device to rise to the surface of the water, thus indicating that the fish has been caught at the bait. It will be obvious that the degree of inclination of the disc 16 will determine the depth at which the device will sink.

In order to reset the device, the sleeve 18 is slid along the shank 10 until the projection 26 on the trigger 25 comes opposite to one of the slots 27 provided on the shank. The trigger is then pivoted on its fulcrum until the projection 26 engages with the slot 27, and the lug 30 on the spring 28 is engaged by the projection 19 carried by the sleeve 18. When the sleeve 18 is connected by the link 20 to the disc 16, it will be obvious that, by sliding the sleeve along the shank until the trigger assumes the position shown in Figure 1, the disc 16 will automatically assume the normal slanting position also shown in Figure 1. As a series of slots 27 is provided along the shank 10, the position of the sleeve 18 and trigger 25 may be varied, and thereby control the degree of slanting of the disc 18 which determines the depth at which the sinker will travel.

What I claim as my invention is:

1. A floating sinker comprising a tubular shank having a bend along its length, a bearing secured to the shank at the bend, a disc having a central opening through which the shank extends, a pin extending through the bearing and pivotally securing the disc to the shank, a sleeve slidably mounted on the shank, a connecting link between the sleeve and the disc, means to vary the anchoring point of the connecting link on the disc, a trigger pivotally connected to the sleeve, a lug on the member engaging one of a plurality of spaced slots on the shank, a resilient element carried by the pivot member designed to engage a lug on the sleeve, means to adjust the tension of the resilient member, and a flexible element connected to the trigger.

2. A floating sinker comprising a tubular shank having a bend along its length, a disc pivotally mounted on the shank, a rudder pivotally mounted on the disc, a sleeve slidably mounted on the shank, a connecting link between the sleeve and the disc, a trigger operatively mounted on the sleeve and flexible element connected to the trigger, as and for the purpose described.

3. A floating sinker comprising a tubular shank having a bend along its length, a bearing formed on the bend of the shank, a disc having a central aperture through which the shank extends, apertured lugs on the disc, a pin extending through the bearing and the apertured lugs, a sleeve slidably mounted on the shank, a connecting link between the sleeve and the disc, a trigger pivotally mounted on the sleeve, a resilient element on the trigger engaging a lug on the sleeve, a flexible element extending through the tubular shank and connected to the trigger, and a second flexible element connected to the outer end of the trigger and engaging a pulley at the end of the shank.

4. A floating sinker comprising a tubular shank having a bend along its length, a bearing formed on the bend of the shank, a disc having a central aperture through which the shank extends, apertured lugs on the disc, a pin extending through the bearing and apertured lugs, a rudder on the disc, a sleeve slidably mounted on the shank, a connecting link between the sleeve and disc, a trigger pivotally mounted on the sleeve, a resilient element on the trigger engaging a lug on the sleeve, a flexible element extending through the tubular shank, and connected to the trigger, and a second flexible element connected to the outer end of the trigger, and engaging a pulley at the end of the shank.

5. The floating sinker claimed in claim 3, in which the connecting link is formed with an opening at its lower end, a projection on the disc having a plurality of openings therein, an offset pin extending through the openings to pivotally secure the link to the disc, and means to retain the offset pin in angular position relatively to the disc.

6. The floating sinker claimed in claim 3, in which a second disc is pivotally mounted on the shank adjacent the first disc, and a joining link retaining the two discs in parallel relation.

In witness whereof I have hereunto set my hand in the presence of three witnesses.

JOHN WILLIAM BOND.

Witnesses:
M. E. MALIGE,
P. R. BROWN,
W. T. S. ANDERSON.